Patented May 5, 1942

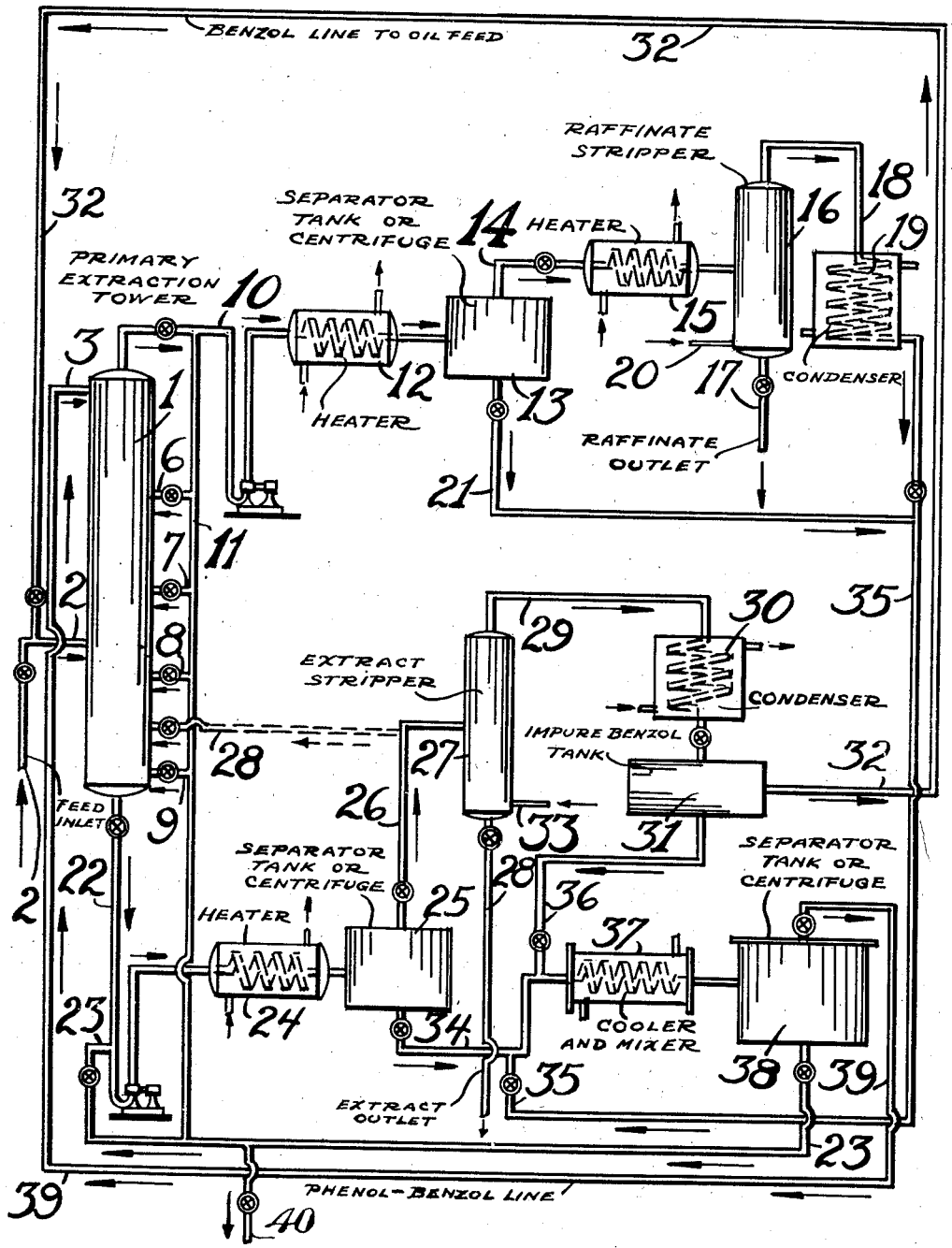

2,281,897

UNITED STATES PATENT OFFICE 2,281,897

SOLVENT TREATING PROCESS

James M. Whiteley, Jr., Westfield, N. J., assignor to Standard Oil Development Company, a corporation of Delaware Application January 11, 1939, Serial No. 250,265

8 Claims. (Cl. 196—13)

The present invention relates to an improved process of solvent treating mineral oils. The invention is especially directed to a process of recovering the selective solvent in a solvent treating operation without distilling the same. According to the present process, petroleum oils are treated with a selective solvent in conjunction with a non-selective solvent and water and the selective solvent recovered from the petroleum oil without distilling.

It is well known in the art to treat petroleum oils with various selective solvents which have the ability to segregate the relatively more paraffinic constituents from the relatively more aromatic constituents. In these processes solvents of the class of solvents which have a preferential selectivity for the more aromatic type compounds are usually employed. Solvents of this class are, for example, phenol, furfural, sulfur dioxide, cresol, nitro benzene, aniline, beta beta dichlor diethyl ether and the like. It is also known to use other substances as, for example, substances of the class of liquefied normally gaseous hydrocarbons, in combination with the above described class of solvents. The usual method of treating the oil with the solvent is to contact the oil in a countercurrent solvent treating tower process. In this operation the heavier phase, usually the solvent, is introduced in the top of a countercurrent treating tower, while the lighter phase, usually the oil, is introduced in the bottom of the countercurrent treating tower. Efficient contact between the countercurrently flowing phases is secured by various distributing and contacting means. Conditions are maintained in the tower to secure the formation of a relatively solvent poor or raffinate phase and a solvent rich or extract phase. The respective phases are removed from the tower and the solvent separated from the extract and raffinate by any suitable means, usually by distillation.

In these processes many procedures have been suggested for recovering the selective solvent from the oil without the necessity of distillation. For instance, it has been suggested that the raffinate and solvent extract be reextracted with a solvent which has a preferential selectivity for the oil as compared to the primary selective solvent. For example, it is known to solvent treat petroleum oils with a phenolic type solvent and to re-extract the raffinate phase and the solvent extract phase with a narrow cut naphtha solvent boiling in the range from 300° to 500° F. The secondary solvent is then removed from the raffinate and extract respectively by means of distillation. This is a decided advantage over prior processes, since the latent heat of the secondary solvent is considerably less than the latent heat of the primary solvent as, for example, phenol. Processes of this character have not, however, been entirely successful due to the fact that the very highly aromatic constituents are more soluble in the phenol than they are in the secondary solvent employed. The result is that the highly aromatic constituents continually build up in the phenol phase, necessitating frequent purification steps of the phenol.

I have now discovered a process by which it is possible to treat mineral oils with solvents of the class having a preferential selectivity for the more aromatic type constituents and to separate these solvents from the mineral oil without distilling the respective phases. My process utilizes a solvent which has a preferential selectivity for the more aromatic type constituents of a petroleum oil as compared to the more paraffinic type constituents, a non-selective solvent and water. The process of my invention may be readily understood by reference to the attached drawing illustrating one modification of the same.

For purposes of illustration, the feed oil is taken as a petroleum lubricating oil, the selective solvent as phenol, and the non-selective substance as benzol. The feed oil is introduced into primary treating tower 1 by means of feed line 2. The feed oil prior to its introduction into tower 1 is mixed with benzol which is introduced into feed line 2 by means of line 32. The feed flows upwardly through tower 1 contacting a downflowing solvent mixture of phenol and benzol which is introduced into the upper part of tower 1 by means of solvent feed line 3. Water or phenolic water is introduced into tower 1, preferably at more than one stage, by means of water injection lines 6, 7, 8, and 9 respectively. Conditions are maintained in tower 1 to cause the formation of a solvent poor or raffinate phase and a solvent rich or extract phase. The raffinate phase is withdrawn from tower 1 by means of line 10 and mixed with an additional quantity of water introduced into line 10 by means of line 11. The mixture comprising the raffinate phase and added water is then passed through heater 12 in which the temperature is raised to secure an optimum solubility of the phenol in water and the raffinate in benzol. The heated mixture is then passed into phase separating tank or centrifuge 13 in which the phases are separated. The oil-benzol phase comprising essentially all the raffinate and containing benzol and a small quantity of phenol is removed from separator 13 by means of line 14. This phase is then passed through heater 15 and introduced into raffinate stripper 16. Solvent-free raffinate is removed from raffinate stripper 16 by means of line 17 and the benzol and phenol removed overhead by means of line 18 and condensed in condenser 19. If desirable, steam may be introduced into the raffinate stripper 16 by means of steam line 20. The phenol water phase separated in separator 13 is removed by means of line 21 and combined with the benzol from raffinate stripper 16.

In a similar manner, the solvent extract phase from primary extraction tower 1 is removed by means of line 22 and combined with an additional quantity of water introduced by means of line 23. The mixture of solvent extract and water is then passed through heater 24 in which the temperature is raised to an optimum solubility temperature of the phenol in water and the extract in benzol. The heated mixture is then introduced into separator 25 in which the phenol-water phase separates from the benzol-extract phase. The benzol-extract phase is withdrawn from separator 25 by means of line 26 and introduced into extract stripper 27. When desirable, a portion of this phase may be re-introduced as reflux into tower 1 by means of reflux line 28. In extract stripper 27, the extract is separated from the benzol, preferably by distillation. If desirable, steam may be introduced into extract stripper 27 by means of line 33. The solvent-free extract is withdrawn from extract stripper 27 by means of line 28. The benzol separated from the extract in extract stripper 27 is removed overhead by means of line 29, condensed in condenser 30, and passed to an impure benzol storage tank 31. The quantity of benzol desirable in the oil feed is removed from benzol storage tank 31 by means of line 32 and introduced into feed line 2. The rest of the benzol is removed from storage tank 31 by means of line 36 and mixed with the water-phenol phase.

The phenol-water phase in separator 25 is removed by means of line 34 and combined with the phenol-water phase separated from the raffinate which is introduced into line 34 by means of line 35. The benzol separated from the raffinate is mixed with the phenol-water phase removed from the raffinate by means of line 18. The combined phenol-water phases from the extract respectively, together with the benzol from the raffinate and with excess benzol removed from the extract from line 36 are passed through cooler and mixer 37 and then introduced into separator tank or centrifuge 38. The cooled mixture in tank 38 separates into a lower layer comprising a phenolic water phase and into an upper layer comprising a benzol-phenol phase. The benzol-phase is removed by line 39 and recycled to the top of tower 1 by means of line 3. The phenolic water phase is removed from separator 38 by means of line 23 and recycled, preferably into more than one stage of the primary extraction tower, and also reintroduced into the raffinate phase and solvent extract phase respectively. The water introduced into stills 16 and 27 as steam is removed as excess water in line 40 and its phenol contents may be recovered by any of several well known means.

The process of the present invention may be widely varied and conditions adjusted to secure optimum operating conditions which will be dependent upon the particular oil being treated and the solvent being used. In general, the process is applicable in the treatment of petroleum oil with a selective solvent selected from the class of solvents which have a preferential selectivity for the relatively hydrogen poor constituents as compared to the relatively hydrogen rich constituents in conjunction with a non-selective solvent and in conjunction with water. Suitable non-selective solvents are, for example, benzol, toluol, xylol, dimethyl naphthalene, carbon disulfide, ethyl ether, and the like. The process, however, is particularly applicable and gives especially desirable results when treating a petroleum oil with a phenolic type solvent as, for example, phenol, in conjunction with water. The water is preferably introduced into the countercurrent treating tower at more than one stage.

The countercurrent treating operation may be conducted under any desirable conditions, depending upon the particular petroleum oil being treated and the solvent or solvent mixture being used. In general, it is preferred to use atmospheric pressure, although other pressures may be employed. It is also preferred to have a constant temperature throughout the tower which is preferably in the range between the melting point of the solvent and the temperature at which complete miscibility occurs between the respective phases. When treating with phenol in conjunction with benzol and water, it is preferred to have the temperature in the range from about 60° F. to 150° F.

The quantity of solvent used per volume of oil being treated will depend upon the particular oil and the solvent mixture employed, as well as the yield and quality of products desired. In general, it is preferred to use from one to four volumes of solvent per volume of oil being treated. The composition of the solvent likewise will depend upon the particular selective solvent used, the particular non-selective solvent used, as well as upon the oil being treated. When using a solvent mixture comprising phenol and benzol, it is preferred to use a solvent comprising from 70% to 90% of phenol. It is also desirable, in accordance with the process of the present invention, to introduce a sufficient quantity of non-selective solvent into the feed oil prior to the introduction of the feed oil into the countercurrent treating tower. This quantity is adjusted so that the equilibrium conditions of the tower at the point of introduction will be least disturbed. It has been found that desirable results are secured when utilizing a phenol-benzol solvent to introduce approximately 10% of benzol into the feed oil, based upon the volume of feed.

The quantity of water introduced into the raffinate and extract phases respectively will also vary, depending upon the solvent mixture used and the petroleum oil being treated. In general, it is preferred to introduce from one-half to two volumes of water into the raffinate phase and to heat the mixture from 50° F. to 100° F. above the temperature existing in the tower. When using phenol and benzol as the solvents, desirable results are secured when using from 25% to 75% of water based upon the volume of total raffinate phase, and by heating the mixture to a temperature in the range from 160° F. to 225° F.

The quantity of water introduced into the solvent extract phase should be in the range from about two to four volumes of water per volume of extract and the mixture heated to a temperature in the range from 160° F. to 250° F.

The benzol removed from the raffinate is preferably combined with the phenol-water phases from the raffinate and extract respectively. A portion of the benzol removed from the extract is preferably recycled and re-introduced into the feed oil prior to the introduction of the feed oil into the countercurrent tower. Any remaining benzol removed from the extract is combined with the water-phenol phases from the extract and raffinate respectively. The combined water-phenol phases and the benzol phases are cooled to a temperature which is below the temperature existing in the countercurrent treating tower. When using benzol and phenol as the solvents, it is preferred to cool the water-phenol phase to a temperature in the range from about 25° F. to 50° F. below the temperature existing in the countercurrent treating tower.

In order to further illustrate the invention, the following example is given which should not be construed as limiting the invention in any manner whatsoever:

*Example*

A petroleum oil of the following inspections:
Gravity °A. P. I. ----------------------------- 25.6
Viscosity Saybolt at 100° F ----------------- 440
Viscosity Saybolt at 210° F ----------------- 57
Viscosity index ----------------------------- 76
Viscosity gravity constant ------------------ 0.873
Color ----------------------------------- ¼ Robinson when treated in accordance with the process of the present invention gives a raffinate and extract having the following inspections:

|  | Raffinate | Extract |
|---|---|---|
| Gravity | 30.6 | 12.7 |
| Viscosity Saybolt at 100° F | 282 | 3988 |
| Viscosity Saybolt at 210° F | 52 | 102 |
| Viscosity index | 101 | −80 |
| Viscosity gravity constant | 0.803 | 0.929 |
| Color Robinson | 3¼ | Dark |

A volumetric material balance on the treating tower is as follows:

|  | Oil feed | Solvent feed | Water injected |
|---|---|---|---|
| Oil | 100 | 1 |  |
| Benzol | 10 | 40 | Trace |
| Phenol |  | 200 | 1 |
| Water |  | 12 | 10 |
| Total | 110 | 253 | 11 |

Total volumes in, 374.

|  | Raffinate phase out | Extract phase out |
|---|---|---|
| Oil | 76 | 25 |
| Benzol | 8 | 42 |
| Phenol | 17 | 184 |
| Water | Trace | 22 |
| Total | 101 | 273 |

Total volumes out, 374.

The material balance on the raffinate phase is as follows:

|  | Raffinate phase from countercurrent treating tower | Additional water injected | Total raffinate phase to heater and separator tank (13) |
|---|---|---|---|
| Oil | 76 |  | 76 |
| Benzol | 8 |  | 8 |
| Phenol | 17 | 4 | 21 |
| Water | Trace | 40 | 40 |
| Total | 101 | 44 | 145 |
| Total | 145 |  | 145 |

|  | Phenol-water phase from separator tank (13) | Oil-benzol phase from separator tank (13) | Bottoms from raffinate stripper (16) | Overhead from raffinate stripper (16) |
|---|---|---|---|---|
| Oil | 1 | 75 | 75 |  |
| Benzol | 2 | 6 |  | 6 |
| Phenol | 19 | 2 |  | 2 |
| Water | 40 | Trace |  |  |
| Total | 62 | 83 | 75 | 8 |
| Total | 145 |  | 83 |  |

The material balance on the extract phase is as follows:

|  | Extract phase from countercurrent treating tower | Additional water injected | Total extract phase to heater and separator tank (25) |
|---|---|---|---|
| Oil | 25 |  | 25 |
| Benzol | 42 |  | 42 |
| Phenol | 184 | 55 | 239 |
| Water | 22 | 550 | 572 |
| Total | 273 | 605 | 878 |
| Total | 878 |  | 878 |

|  | Phenol-water phase from separator tank (25) | Oil-benzol phase from separator tank (25) | Bottoms from extract stripper (29) | Overhead from extract stripper (29) |
|---|---|---|---|---|
| Oil | 0 | 25 | 25 |  |
| Benzol | 32 | 10 |  | 10 |
| Phenol | 235 | 4 |  | 4 |
| Water | 570 | 2 |  | 2 |
| Total | 837 | 41 | 25 | 16 |
| Total | 878 |  | 41 |  |

The material balance on separator storage tank 38 is as follows:

|  | Phenol-water phase from separator tank (13) | Overhead benzol phase from raffinate stripper (16) | Phenol-water phase from separator tank (25) | Benzol phase from benzol tank (31) | Total volumes in separator tank (38) |
|---|---|---|---|---|---|
| Oil | 1 |  | 0 |  | 1 |
| Benzol | 2 | 6 | 32 | 0 | 40 |
| Phenol | 19 | 2 | 235 | 4 | 260 |
| Water | 40 |  | 570 | 2 | 612 |
| Total | 62 | 8 | 837 | 6 | 913 |
| Total |  | 913 |  |  | 913 |

|  | Solvent out from separator tank (38) | Phenolic water for injection into treating tower | Phenolic water for mixing with raffinate | Phenolic water for mixing with extract | Total out from separator tank (38) |
|---|---|---|---|---|---|
| Oil | 1 |  |  |  | 1 |
| Benzol | 40 |  |  |  | 40 |
| Phenol | 200 | 1 | 4 | 55 | 260 |
| Water | 12 | 10 | 40 | 550 | 612 |
| Total | 253 | 11 | 44 | 605 | 913 |
| Total |  | 913 |  |  | 913 |

From the above data it is readily apparent that improved unexpected results are secured by the process of the present invention. The phenol is readily removed from the oil without the necessity of distilling the same in an economical manner, resulting in improved operating conditions.

The process of the present invention is not to be limited by any theory as to mode of operation, but only by the following claims in which it is desired to claim all novelty insofar as the prior art permits:

I claim:

1. In a process in which petroleum oil is treated with phenol and with benzol, and solvent extract and raffinate phases separated, the improvement which comprises mixing the respective separated phases with water under conditions to form phenol water phases and benzol oil phases, separating the benzol oil phases, removing the benzol therefrom and combining it with said phenol water phases, then subjecting said phenol water phases and added benzol to conditions to cause separation of a phenolic water phase and a phenol-benzol phase, recycling said phenol-benzol phase to said solvent treating system and introducing said phenolic-water phase into said raffinate and extract phases respectively.

2. Improved solvent treating process comprising contacting petroleum oil with a solvent mixture comprising a selective solvent and a non-selective solvent under conditions to form a raffinate phase and a solvent extract phase, separating said phases and combining each phase with a sufficient quantity of water under conditions adapted to produce selective solvent water phases and non-selective solvent oil phases, separating said non-selective solvent oil phases, removing the non-selective solvent therefrom and combining the non-selective solvent with said selective solvent water phases, subjecting said selective solvent water phases to conditions adapted to produce a selective solvent non-selective solvent phase and a water phase, recycling said selective solvent non-selective solvent phase to said treating system and said water phase to said raffinate and extract phases respectively.

3. Process in accordance with claim 2 in which said selective solvent is phenol and said non-selective solvent is benzol.

4. In a process in which petroleum oil is treated with phenol, the improvement of recovering the phenol without distilling the same which comprises introducing a mixture of phenol, benzol, and water into a countercurrent treating system, intimately countercurrently contacting with feed oil containing benzol, introducing phenolic water at a multiplicity of points in the system, removing a raffinate phase and a solvent extract phase from said system, adding sufficient phenolic water to said separated phases and heating said phases to a temperature of about 200 F. while maintaining all components in the liquid state, removing separated benzol-oil phases at this temperature from the phenol water phases and recovering the oil therefrom by distillation, combining the distillate removed from said benzol-oil phases with said phenol water phases, cooling said mixture to a temperature below that maintained in the column and separating the resulting phenolic water phase and phenol-benzol phase, followed by recycling said separated phase to the system.

5. Process in accordance with claim 4 in which said countercurrent system is operated at temperatures in the range from 60° F. to 150° F. and the final separation of the phenol-benzol phase from the phenolic water phase is carried out at a temperature in the range from about 40° F. to 130° F., said temperature being at least 20° below the temperature existing in the extraction system.

6. Process in accordance with claim 4 in which the phenol to benzol ratio in the countercurrent system is in the range from 70% phenol-30% benzol to 90% phenol-10% benzol and in which the oil feed to the system contains from about one to ten percent.

7. Process according to claim 4, in which a portion of the distillate removed from the benzol-oil phases is admixed with the fresh feed oil.

8. In a process for separating a lubricating fraction of petroleum into its relatively more paraffinic and relatively more aromatic constituents which comprises treating the lubricating fraction with a selective solvent and a non-selective solvent and then separating an extract phase and a raffinate phase, the improvement which comprises adding water to the separated phases, heating the phases to a temperature at which selective solvent water phases and non-selective solvent oil phases are formed, separating the non-selective solvent oil phases from the selective solvent water phases, recovering solvent-free raffinate and solvent-free extract from the respective non-selective solvent oil phases, combining the non-selective solvent with the selective solvent water phases, cooling the mixture to form a water phase and a selective solvent non-selective solvent phase, and returning the selective solvent non-selective solvent phase for treatment of fresh oil.

JAMES M. WHITELEY, Jr.